Dec. 17, 1935. F. L. SPULER ET AL 2,024,891
PINION PULLER
Filed Nov. 20, 1934
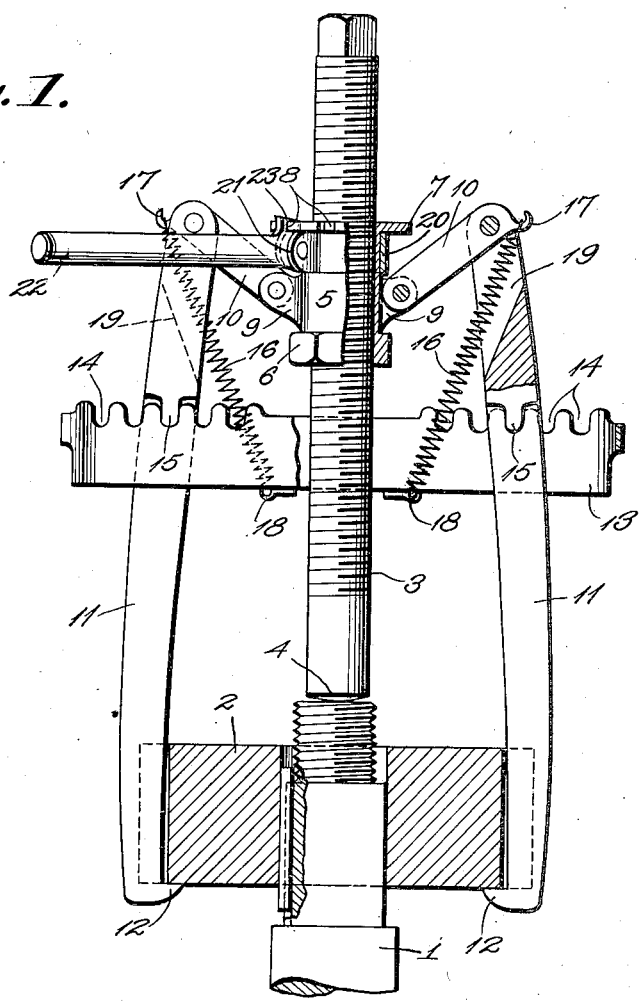
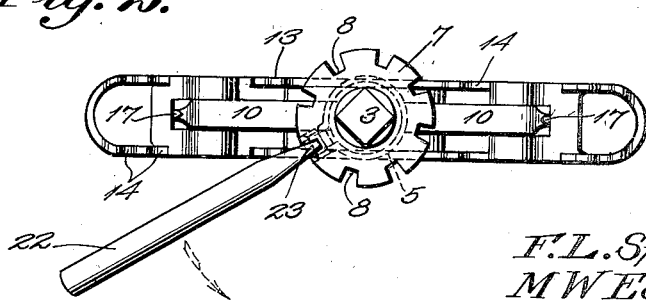
F. L. Spuler
M. W. Edwards
INVENTORS Patented Dec. 17, 1935

2,024,891

UNITED STATES PATENT OFFICE 2,024,891

PINION PULLER

Frank L. Spuler and Melven W. Edwards, Republic, Wash.

Application November 20, 1934, Serial No. 753,943

3 Claims. (Cl. 29—85)

This invention seeks to provide a simple compact and easily manipulated tool which will operate efficiently to remove pinions from shafts or to withdraw other objects from parts on which they are secured. One embodiment of the invention is illustrated in the accompanying drawing and will be hereinafter fully described, the novel features being particularly defined in the appended claims.

In the drawing:

Figure 1 is a side elevation, partly in section, of the tool in operative position.

Figure 2 is a plan view.

The drawing shows a shaft end 1 upon which a pinion 2 is keyed. The pulling tool comprises a shank or bar 3 which is externally threaded and is adapted to bear at its end 4 against the end of the shaft, the shaft extending in axial alinement with the shank. Mounted on the shank and engaged therewith is a sleeve nut 5 having a polygonal flange 6 at its lower end and a circular flange 7 at its upper end, the latter flange having radial notches 8 therein spaced equidistantly through its entire extent. Perforated ears 9 are formed on the sleeve between its ends and at diametrically opposite points and links 10 are pivoted to the ears and extend outwardly therefrom, pulling arms 11 being pivotally attached to and depending from the outer ends of the links. The pulling arms are provided with teeth or claws 12 at their lower ends adapted to engage under the pinion, as shown in Figure 1, and it may be noted that the pivot pins are removable so that the arms may be reversed, if desired, and thereby to engage behind an internal flange at the open end of a collar or the like which is to be removed from the part on which it is mounted. A slotted cross head or open loop 13 is provided with notches 14 in its upper edges and the shank and pulling arms pass through the cross head as shown, the arms being provided with tapered lugs 15 on their sides to seat in selected notches 14 and thereby set the arms to engage larger or smaller objects, as will be understood. Contractile springs 16 are engaged at their upper ends on hooks 17 on the outer ends of the links 10, and at their lower ends in eyes 18 on the bottom of the cross head whereby to maintain the engagement of the cross head and the arms, the upper ends of the arms being slotted, as at 19, to accommodate the springs.

Mounted loosely on the nut 5 to turn about the same between the ears 9 and the flange 7 is a collar 20 having lugs or ears 21 to which is pivoted one end of a lever 22. A lug 23 is provided on the lever at the pivoted end to engage in a notch 8 in the flange 7. The several parts having been arranged and adjusted as shown and described, the lever is rocked on its pivot to engage the lug or tooth 23 in a notch 8 of the flange 7 and is then turned about the shank, the latter movement causing the nut to rotate upon the shank and to ride along the same through its threaded engagement therewith. The links 10 will travel toward the end of the shank with the nut and the pulling arms must go with the links so that the pinion will be drawn off the shaft.

From the foregoing description, taken in connection with the drawing, it will be seen that I have provided a simple compact tool by the use of which a strong pull may be easily exerted upon a pinion which has resisted efforts to remove it, due to corrosion or some other cause.

Having described our invention, what we claim is:

1. A pulling tool comprising a threaded shank, a nut mounted on and engaged with the shank, a lever pivotally and rotatably mounted on the nut and having a lug adapted to interfit with the nut and lock the lever to the nut for rotating the nut, pulling arms, a cross head spanning the shank and supporting the arms, and links connecting the nut with the arms.

2. A pulling tool comprising a threaded shank, a nut mounted on and engaged with the shank and having a flange at one end provided with notches, a collar turnable about the nut, a lever pivoted on the collar, a lug on the lever engageable in a notch in the flange, a cross head spanning the shank, pulling arms supported by the cross head, and connections between the pulling arms and the nut.

3. A pulling tool comprising a shank, a cross head spanning the shank and having a series of notches in its upper side, pulling arms provided on their sides with lugs to seat in selected notches in the cross head, a nut mounted on the shank and operatively connected with the arms to effect a pulling action through the arms, springs attached to the cross head and connected with the arms to maintain the engagement of the arms with the cross head, and a lever rotatably and pivotally mounted on the nut and having a projection adapted to lockingly engage the nut for rotating the nut.

FRANK L. SPULER.
MELVEN W. EDWARDS.